US 6,672,389 B1

(12) United States Patent
Hinrichs

(10) Patent No.: US 6,672,389 B1
(45) Date of Patent: Jan. 6, 2004

(54) BULGED SINGLE-HINGED SCORED RUPTURE HAVING A NON-CIRCULAR VARYING DEPTH SCORE LINE

(75) Inventor: James O. Hinrichs, Odessa, MO (US)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 10/210,724

(22) Filed: Jul. 31, 2002

(51) Int. Cl.[7] ............................................. E21B 34/08
(52) U.S. Cl. .................. 166/317; 166/250.08; 166/319; 166/374; 166/387; 137/68.25; 137/68.27; 220/89.2
(58) Field of Search ............................ 166/317, 250.08, 166/319, 373, 374, 386, 387; 137/68.19, 68.25, 68.27, 910; 220/89.2

(56) References Cited

U.S. PATENT DOCUMENTS 5,996,696 A * 12/1999 Jeffree et al.
6,298,869 B1 * 10/2001 Strelow

* cited by examiner

*Primary Examiner*—Roger Schoeppel
(74) *Attorney, Agent, or Firm*—Hovey Willims LLP

(57) ABSTRACT

A unitary, forward buckling rupture disc is provided that is adapted to be mounted in a holder in which the disc is in closing relationship to a tubing string in an oil well and has greatest utility for testing the integrity of the connection between the sections of oil well tubing strings. The disc is designed to withstand the fluid pressure head in the string and a leak test pressure, and to then burst and fully open under a predetermined overpressure. The concavo-convex bulged section of the disc has a non-circular, continuous score line formed in the concave face thereof. The score line is of continuously varying depth around its circumference and includes an outwardly projecting cam segment which is of greatest depth that ruptures first and is in direct opposition to a lesser depth score line portion forming a hinge area for the burst region of the disc.

24 Claims, 4 Drawing Sheets

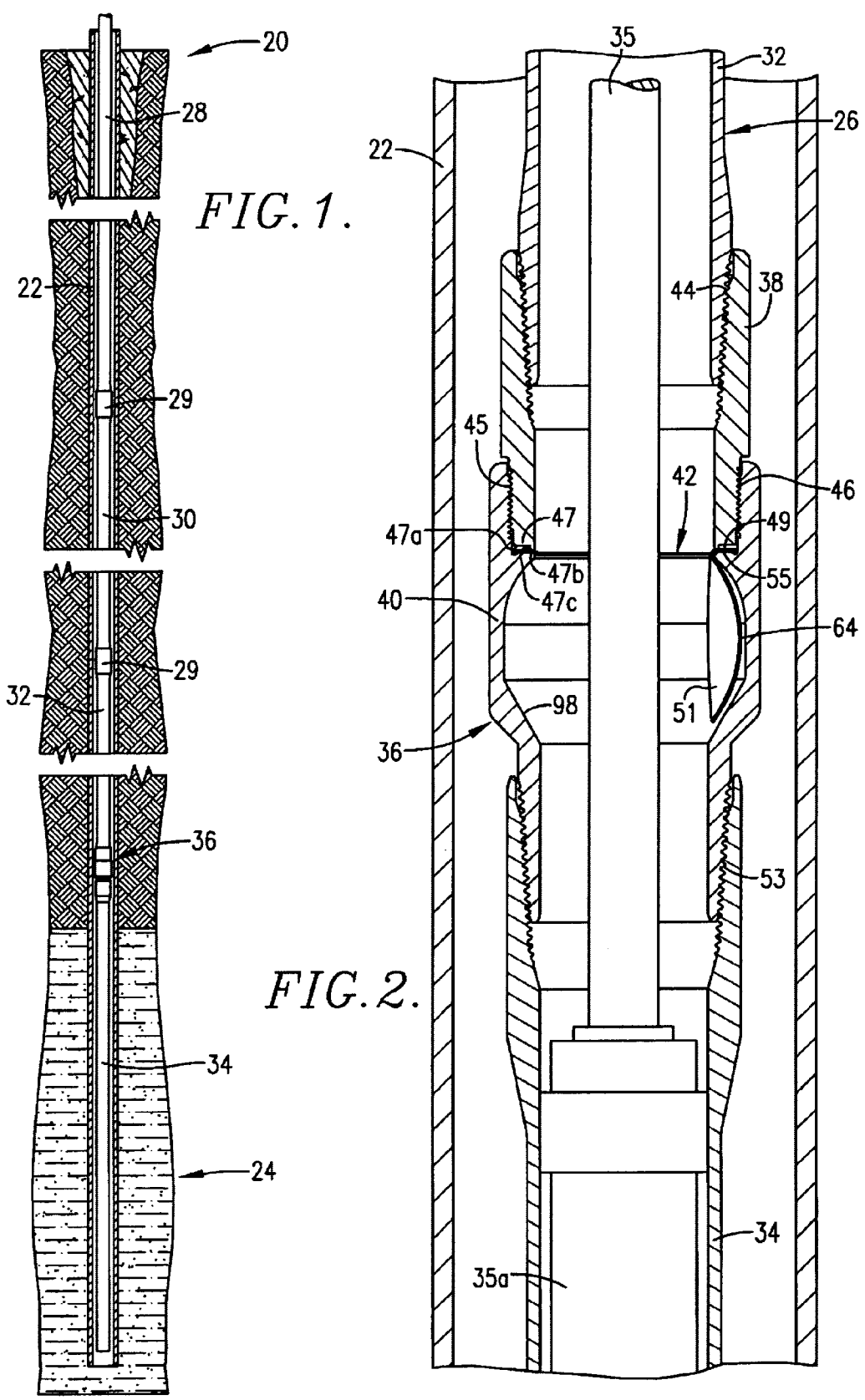

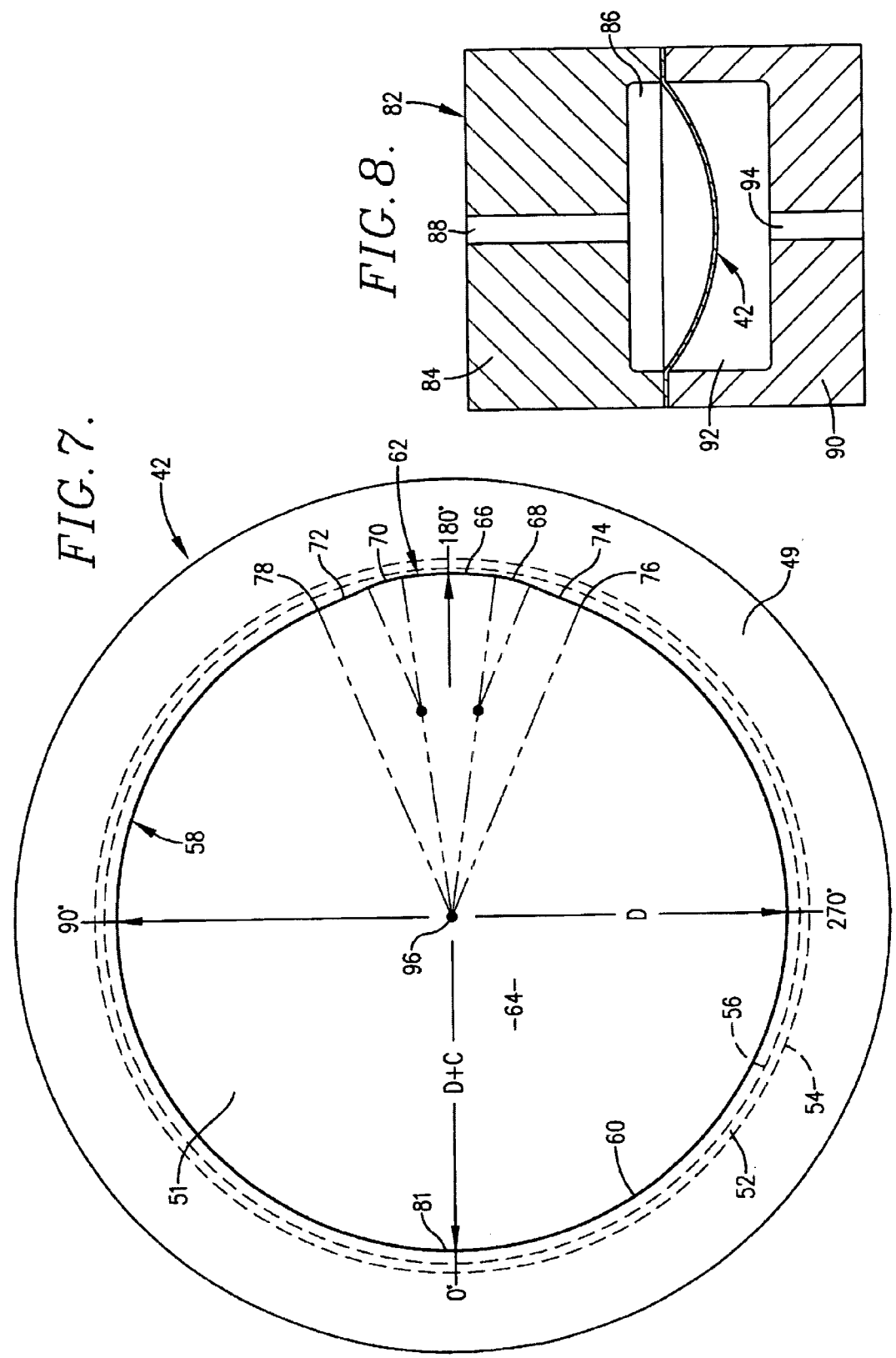

BULGED SINGLE-HINGED SCORED RUPTURE HAVING A NON-CIRCULAR VARYING DEPTH SCORE LINE

BACKGROUND OF THE INVENTION

1. Field of The Invention

The present invention is broadly concerned with leak integrity testing apparatus for use in testing liquid-conveying conduits, and especially multi-sectional pipe strings, used in various industrial and oil well applications. More particularly, the invention pertains to such apparatus, and especially a frangible forward acting rupture disc forming a part thereof, wherein the rupture disc is of concavo-convex design and has a non-circular, continuous score line formed in the concave face thereof. The score line is of continuously varying depth around the circumference thereof and includes an outwardly projecting cam segment which is of greatest depth that ruptures first and is in direct opposition to a lesser depth score line portion forming a hinge area for the burst region of the disc preventing separation thereof from the flange portion of the disc upon disc rupture. The apparatus has particular utility for use in testing the integrity of the connection between the sections of oil well tubing strings, but also may be used in petroleum refining and petrochemical operations, as well as other uses in which a liquid is conveyed under pressure through a pipe or conduit.

2. Description of the Prior Art

In order to place an oil well in service, an elongated, sectionalized tubing string is lowered into the well casing, with the tubing string housing a sucker rod and pump assembly. In deep wells, the tubing string may extend thousands of feet from grade down to an oil formation. Leaks in the joints between string sections have a significant impact on pumping efficiency and oil well production. In the past, it has sometimes been necessary to remove the pipe string, locate joint leaks, and repair the string. This can represent a very substantial expense both in terms of repair costs and well downtime.

U.S. Pat. No. 5,996,696 describes a method and apparatus for leak integrity testing of oil well tubing within the well casing, thus eliminating the need for string removal for such testing. The apparatus of the '696 patent includes a housing interposed between string sections (usually adjacent the lower end thereof close to the pump and well formation). The housing is equipped with a metallic rupture disc in closing, flow-blocking relationship. When it is desired to test the string, predetermined fluid pressure is applied against the rupture disc. If the tubing string is sufficiently leak-free, the rupture disc will burst at or about the predetermined burst pressure. On the other hand, if substantial leaks are present, insufficient pressure will be developed within the string to burst the disc.

The preferred rupture disc design disclosed in the '696 patent is a metallic, concavo-convex disc having a discontinuous score line formed in a face of the bulged rupture portion thereof. The discontinuity in the score line serves as a hinge region for the disc. While the apparatus and methods described in this patent represent a significant breakthrough in the art, it has been found that sometimes the disc design is not optimal from a performance standpoint. As can be appreciated, a useful rupture disc in this context must reliably burst at desired burst pressures, or inaccurate test results may be obtained. In addition, the disc after being ruptured must not fragment while still allowing full bi-directional liquid fluid flow therethrough.

SUMMARY OF THE INVENTION

The present invention overcomes the problems outlined above and provides an improved leak testing apparatus for liquid-conveying line applications, and especially oil well tubing strings, giving increased testing reliability. Broadly speaking, the apparatus of the invention includes a tubular holder adapted for coupling to an oil well tubing string with a rupture disc within the holder in normally closing relationship to the central passage through the holder. The disc includes an outer annular peripheral flange portion having a first annular face, and an opposed second annular face and an inner circular margin, and an inner concavo-convex, generally hemispherical bulged region inboard of and projecting away from the first annular face of the flange portion. The bulged region has opposed convex and concave faces and is provided with an outer circular margin and a unitary, annular, transversely arcuate transition region integral with and joining the outer circular margin of the bulged region with the inner circular margin of the flange portion.

The bulged region of the disc is provided with a continuous non-circular score line in the concave face thereof adjacent the outer circular margin of the bulged region in proximal spaced relationship to the transition region. The score line has a semi-circular segment of major length, and a second generally curvilinear score line cam segment of minor length with respect to the length of said semi-circular score line segment. The cam score line segment projects outwardly of the diameter of the major score line segment and is located closely adjacent and inboard of the transition region.

The score line varies in depth along the length thereof and is of greatest depth along the cam score line segment and of shallowest depth in substantially direct opposition to the cam score line segment thereby defining a hinge portion of the score line.

The disc is openable under the influence of liquid overpressure directed against the concave face of the disc to allow flow of the liquid past the disc. The cam score line segment is of a depth relative to the remaining portion of the score line to cause the cam score line segment to rupture first under liquid pressure while the major score line segment is of a varying depth which allows the burst region to swing to a fully opened rupture position without severing of the hinge portion of the score line. Upon rupture of the bulged region and full opening of the disc, the edge of the central burst region is disposed in generally perpendicular relationship to the flange portion of the disc.

The tubular holder is provided with sidewall structure configured to generally complementally receive and allow sufficient full opening of the rupture disc under liquid overpressure to thereby permit full flow of liquid through the tubular holder upon rupture of the disc. It has been found that discs of this character provide improved testing results, as compared with prior designs, while allowing full bi-directional flow of liquid through the holder after rupture of the disc.

The provision of the continuous, non-circular score line on the concave face of the disc permits reliable disc rupture and opening owing to the fact that when rupture occurs, the adjacent interconnected score line-defining wall surfaces of the disc separate from each other. This is to be contrasted with the more usual situation where the score line(s) on rupture discs are formed in the face thereof remote from contact with the product and/or pressure. In such a situation, the score line-defining wall surfaces of the disc move toward each other during rupture.

The curvilinear cam portion of the score line, and which is of greatest depth, projects beyond the circumference of the main circular portion of the score line and acts somewhat as a cam or lever to assure reliable opening of the disc at pressures of the order of about 1500 psi to about 2000 psi. Opening pressures of that magnitude are difficult to achieve in discs having a nominal burst diameter of the order of 2 to 3 inches, which are required to block the internal diameter of conventional oil well pipe tubing strings, without the extended, deepest depression portion of the score line which projects beyond the circumference of the major circular portion of the score line.

BRIEF DESCRIPTION OF THE DRAWINGS

FIG. 1 is a fragmentary vertical sectional view illustrating a typical oil well including a casing and internal tubing string, the later having the integrity testing apparatus of the invention installed therein;

FIG. 2 is a greatly expanded, fragmentary vertical sectional view illustrating the integrity testing apparatus within the tubing string, where the rupture disc of the apparatus is in its open, ruptured condition allowing full bidirectional flow through the apparatus;

FIG. 7 is a greatly enlarged, bottom view of the rupture disc illustrating the non-circular score line in the concave face of the bulged region of the disc wherein a cam segment of the score line projects beyond the circumference of the score line is of greatest depth so that the cam segment of the score line ruptures and opens first upon application of overpressure liquid to the concave face of the disc; and FIG. 8 is a diagrammatic, vertical cross-sectional view of components that may be used to effect bulging of the central region of the disc.

Figure 4:
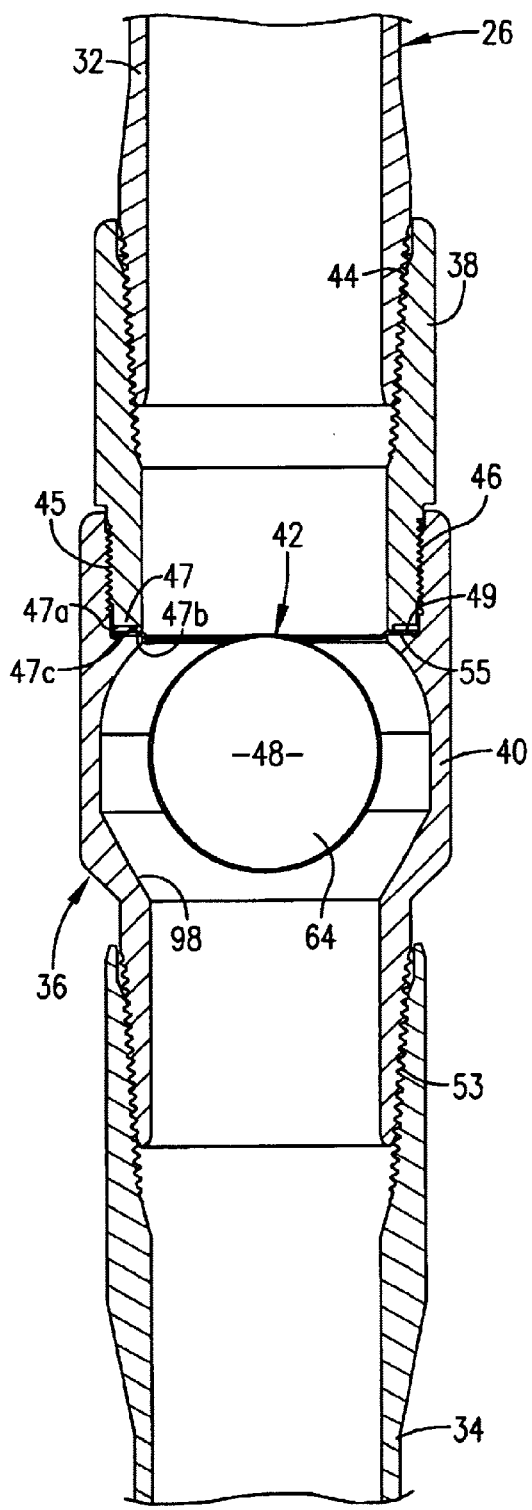
FIG. 4 is a view similar to that of FIG. 3, but illustrating the disc in its ruptured condition.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawings, and particularly FIG. 1, a conventional oil well 20 is shown, having an upright, continuous casing 22 extending from grade downwardly to an oil formation 24. A tubing or pipe string 26 is located within the casing 22 and includes a plurality of end-to-end connected sections such as the sections 28, 30, 32, and 34; it will of course be appreciated that an operating well would have many such sections in its tubing string. A sectionalized, conventional sucker rod 35 with a lowermost pump assembly 35a are within the string 26 in order to effect pumping of oil from the formation 24. The majority of the string sections are interconnected via conventional couplers 29. However, at a selected point along the length of the string 26 (usually near the lower end thereof adjacent the formation 24) integrity testing apparatus 36 is inserted between a pair of tubing sections.

Referring to FIG. 2, it will be seen that the lower end of section 32 is threaded, as is the upper end of section 34. The apparatus 36 is threadably coupled between these tubing sections, and includes a tubular inlet 38 and a tubular outlet 40, with a burst disc 42 interposed between the inlet and outlet. In detail, the inlet 38 is internally threaded as at 44 adjacent its upper end, and is externally threaded as at 46 near its lower end. The lowermost butt end of the inlet 38 presents a stepped configuration 47 defined by an outer annular surface 47a joined to an inner annular surface 47b which is spaced axially of and interconnected to surface 47a by an intermediate face 47c which is transverse to surfaces 47a and 47b. The outlet 40 is internally threaded as at 45 adjacent its upper end for connection to inlet threading 46; similarly, the outlet lower end is threaded as at 53 for connection to the string section 34. The outlet 40 is also provided with an uppermost annular surface 55 directly opposed to annular surfaces 47a and 47b.

Figure 3:
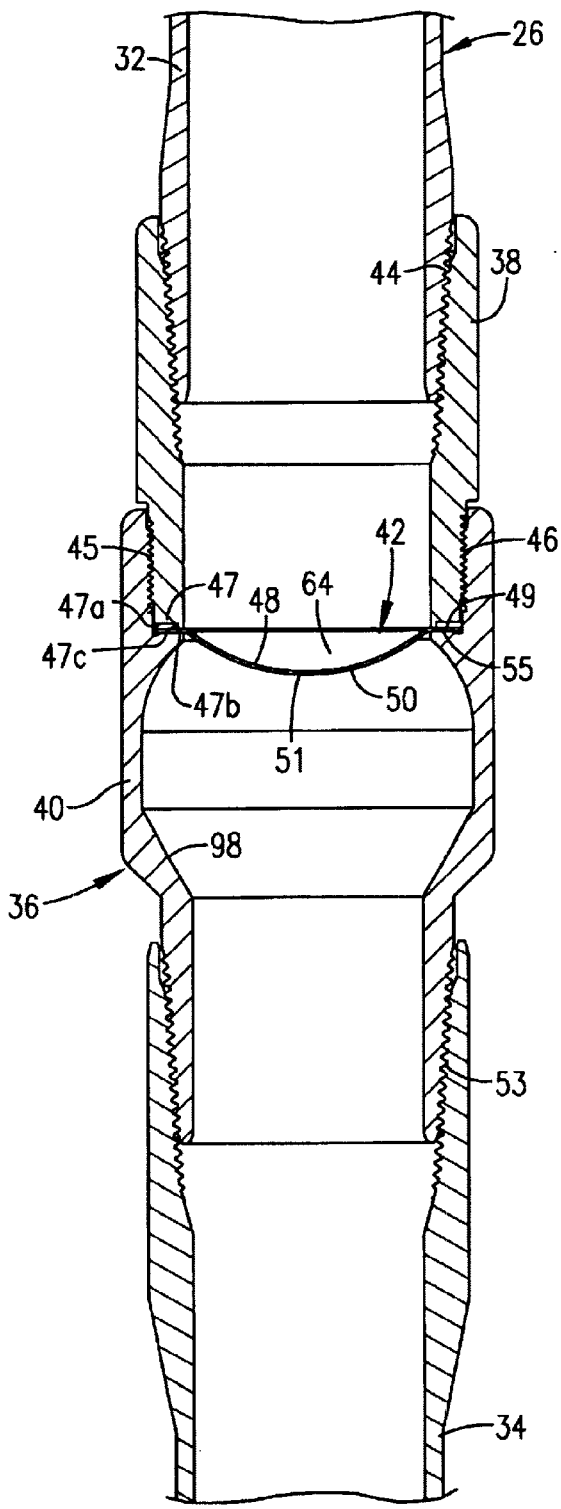
FIG. 3 is a fragmentary vertical sectional view of an oil well tubing string, with the testing apparatus of the invention installed therein, and with the disc in blocking relationship to liquid flow through the string.

As is most apparent from FIGS. 2–4, when the disc 42 is placed between inlet 38 and outlet 40 and the inlet 38 is rotated in the direction to cause the inlet 38 to move toward the outlet 40, the relative movement of the inlet 38 and outlet 40 is arrested when the outer annular flange portion 49 of disc 42 is engaged on opposite sides thereof by surfaces 47b and 54, respectively, to thereby clamp the disc 42 between the inlet 38 and the outlet 40.

The burst disc 42 is best illustrated in FIGS. 4–7. The unitary disc broadly includes an outer, relatively flat annular peripheral flange 49 as well as an inner bulged, concavo-convex burst region 51 presenting a concave face 48 and an opposed convex face 50. The burst region 51 is inboard of flange portion 49, with an annular transversely radiused transition region 52 therebetween. The transition region 52 (FIG. 7) is defined by a pair of imaginary, concentric, circular, laterally spaced apart outer and inner imaginary margins 54, 56 respectively.

The disc 42 is also provided with a continuous score line 58 formed in the concave face 48 thereof inboard in and in proximity to the margin 56 of radiused transition region 52 of disc 42. The score line 58 is located in close proximity to but slightly inwardly of the transition region 52, i.e., it is spaced inwardly from transition region inner margin 56. In addition, the score line 58 is of continuously varying depth throughout it circumferential extent.

Referring to FIG. 7, it is to be seen that the score line 58 is provided with a circular, circumferentially extending score line portion 60 of major length and which extends substantially around the entire periphery of the outer portion of bulged region 51 adjacent the inner margin 56 of radiused transition region 52. Major score line portion 60 merges with a curvilinear cam score line segment 62 of minor length relative to the length of score line portion 60. The cam score line segment 62 extends beyond the circumferential extent of score line portion 60. Preferably, cam score line segment 62 has an outer arcuate base score line portion 66 intermediate opposed curvilinear score line leg portions 68 and 70 that merge with respective outer rectilinear end score line leg portions 72 and 74, which join with corresponding opposite extremities 76 and 78 of score line segment 60.

The midpoint of the base score line portion 70 of cam score line segment 62, indicated as being at 180° in FIGS.

Figure 5:
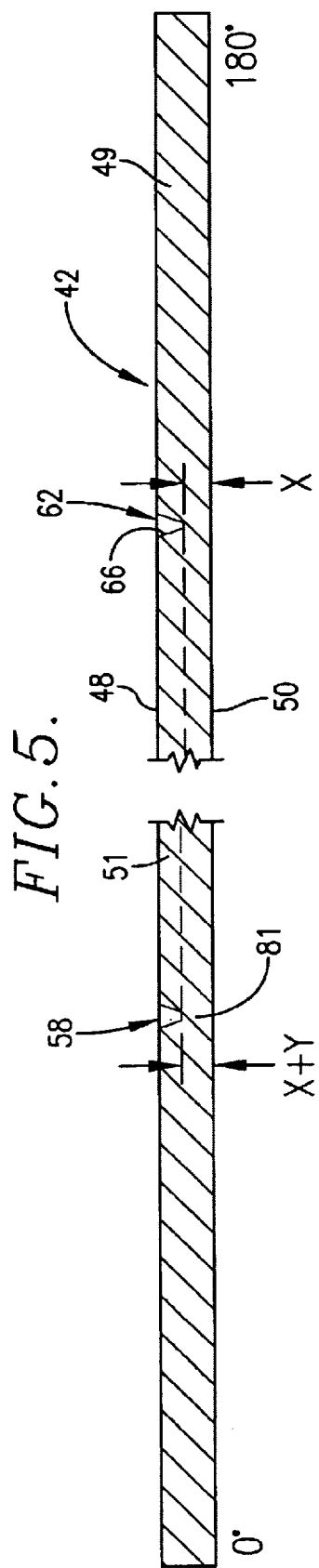
FIG. 5 is a greatly enlarged, fragmentary cross sectional view depicting the disc body after formation of the flange and score line but prior to bulging thereof, and further illustrating the differential depth of the score line along its length.

5–7, is of greatest depth indicated as x+y in FIG. 5, with respect to the circumferential extent of the score line 58. Correspondingly, the score line portion 60 is of shallowest depth X, at the midpoint thereof, indicated as being 0° in FIG. 5, and which is thereby directly opposite the 180° point of the score line 58. The score line 58 continuously varies in increasing depth in opposite directions from the 0° of the score line 58 until the 180° point of cam score line portion 60 is reached.

The score line portion 60 adjacent the 0° point indicated in FIG. 7 is of a depth on opposite sides of the 0° point to define a hinge score line portion which does not sever when the bulged region 46 is subjected to sufficient over pressure to effect rupture of the disc. Accordingly, the central bulged region 51 of the disc 42 does not release from flange 44 thereby resulting in a non-fragmenting rupture disc.

During manufacture of the bulged disc 42, the score line 58 is formed in the surface of a metal blank on what will later become the concave face 48 of the disc 42, making use of an appropriate, differential depth scoring anvil. Only after formation of the score line 58 is the disc bulged to give the concavo-convex burst region 51. While it would be possible to first bulge the disc followed by scoring, from a manufacturing point of view, it is greatly preferred to initially score, followed by bulging. The metal along the transition region 52 is work hardened during bulging of the disc, thereby providing a score line hinge portion 81 of greater strength than the cam score line segment 62. FIG. 8 is a schematic illustration of a conventional die unit 82 that is employed to effect formation of the bulged region 46 of disc 42. Die unit 82 includes a pressure bell 84 having a central cavity 86 therein along with a passage 88 communicating with cavity 86 and adapted to be coupled to a source of high positive pressure fluid. The receiver 90 making up a part of unit 82 has a central cavity 92 which aligns with cavity 86 when pressure bell and receiver 92 are brought into closed relationship as shown in FIG. 8. Passage 94 in receiver 90 communicates with cavity 92 and allows air within the interior of cavity 92 to escape during bulging of a disc 42. In the use of die unit 82, a circular flat metal blank is clamped between the outer opposed circular margins of pressure bell 84 and receiver 90 between cavities 86 and 92. Pressurized fluid is introduced into passage 88 to deform the portion of the metal blank exposed to the fluid within cavity thus effecting bulging of the blank as shown schematically in FIG. 8. The pressurized forming liquid directed into bell 84 is preferably at a pressure sufficiently high to bulge the disc to a point equal to about 80% of the pressure at which the bulged portion would rupture.

Preferably, the disc 42 is formed of a metal selected from the group consisting of Inconel (an alloy of 76% Ni, 17% Cr and 7% of Fe) and nickel, and has a thickness of from about 0.010–0.070 inches, more preferably from about 0.014–0.050 inches. The depth of the score line 58 throughout its length except for the reduced depth score line hinge portion 81 is from about 35–70% of the thickness of the disc, more preferably from about 40–60% of such thickness. The depth of the base portion 66 of cam score line segment 62 at the 180° point indicated in FIG. 7 is from about 0.001 to about 0.004 in. deeper, more preferably from about 0.015 in. to about 0.003 in. deeper, and most preferably about 0.002 in. deeper than the depth of the score line hinge portion 81 of score line portion 60 at the 0° point indicated on FIG. 7.

In a representative disc 42 useful for testing the integrity of a conventional tubing string to be used within an oil well, such disc may be fabricated of an Inconel blank having a thickness of about 0.31 in. and of a diameter of about 3.25 in. The bulged region 51 of such disc may then for example have a diameter of about 2.485 in., defined by the imaginary dashed inner margin of transition region 52. The major score line portion 60 of score line 58 is preferably located about 0.05 in. inboard of imaginary margin 56 of transition region 52. The difference in depth of score line 58 between he 0° point of score line 58 and the 180° point of cam score line segment 62 is preferably about 0.002 in. The arcuate base score line portion 66 is preferably about 0.35 in. in length and is the radius of an arc of about 15.88° about the central axis 96 of disc 42. Each of the score line leg portions 68 of cam score line segment 62 are preferably about 0.14 in. in length and each comprise an arc of about 15.36° from the points 98 and 100 respectively as indicated on FIG. 7. The straight score line leg portions 72 of cam score line segment 62 are preferably each about 0.2 in. in length.

In the representative disc described above, in the case of a disc 42 designed to rupture at a pressure of about 2000 psi, the disc is of 0.031 Inconel material as indicated, and the score line 58 varies in depth from about 0.013 in. at the 0° point indicated at FIG. 7 to about 0.017 in. at the 180° point of FIG. 7. For a disc designed to rupture at about 1500 psi, the score line 58 should vary in depth from about 0.015 in. at the 0° point to about 0.017 in. at the 180° point.

Although preferred rupture discs having a cam score line segment for effecting opening of the bulged region 46 of disc 42 at over pressures at the exemplary 1500 to 2000 psi range, it is to be understood that the cam opening effect afforded by cam score line segment 62 is equally useful in other disc opening pressure applications, as for example, in the range of 4000 psi to 2500 psi. For higher opening pressures, the varying depth score line would not be as deep as specified in the preceding examples, and the thickness of the disc could be greater than specified.

FIGS. 1–4 illustrate the operation of apparatus 36 when placed within a tubing string 26. The flange portion 49 of disc 42 is clamped between the surface 55 of outlet 40 and the annular surface 47b. In this fashion, the disc 42 is firmly sandwiched between tubular inlet 38 and tubular outlet 40. When it is desired to conduct a leak test for the string 26, liquid under an over pressure greater than the pressure exerted on the disc by the column of liquid in the tubing string is applied against the concave face 48 of the disc 42. Assuming that the string 26 is essentially leak-free, at a predetermined liquid over pressure, the disc 42 will rupture along score line 58.

In the case of a rupture disc 42 designed to rupture at a design over pressure of about 1500 psi, when that over pressure level is reached against the face 48 of rupture disc 42, cam score line segment 62 will sever first commencing generally at the 180° point as illustrated in FIG. 7 and then break in opposite directions away from the 180° point toward the score line hinge portion 81 of score line 58. As the disc ruptures along score line 58 starting at the cam score line segment 62, the concavo-convex bulged region 51 of disc 42 will swing in the direction of liquid flow into disposition as illustrated in FIGS. 2 and 4 of the drawings with the non-fragmenting hinge portion 81 of the score line 58 preventing severing of region 51 of the disc 42 from the flange portion 49 thereof. It is noteworthy that the tubular outlet 40 has a generally semi-hemispherical inner surface 98 configured to complementally receive bulged region 51 of the disc 42 upon rupture of region 51. The inner wall 98 of fitting 40 is configured to prevent over swinging of the region 51 which could result in tearing of the hinge portion 81 of score line 58 resulting in disengagement of bulged region 51 from the flange portion 49 of the disc 42. In the fully open position of bulged region 51 of disc 42, the bulged region is maintained in substantially perpendicular relationship to flange portion 49 as illustrated in FIG. 4 and out of the flow path of liquid through inlet 38 and outlet 40. As a result of full opening of the bulged region of 51 as shown in FIGS. 2 and 4, liquid is permitted to flow bi-directionally substantially unimpeded by the opened region 51 of disc 42. Unimpaired bi-directional flow of liquid through the integrity testing apparatus 36 upon opening of disc 42 is an important operating function of the disc 42.

However, owing to the presence of the reduced depth hinge area 84, the burst region 64 will remain attached to the flange 62 and not be carried downward into the pump area of the string.

In instances where it is desired that the disc 42 rupture at a liquid over pressure applied thereto of the order of 2000 psi, it has been found that such opening parameter for the disc may be realized by fabricating the disc of the dimensions and characteristics detailed above. The choice between utilization of a disc 42 designed to rupture at a liquid pressure of 1500 psi versus 2000 psi is primarily a function of the length of the pipe string in a particular well. A 2000 psi opening disc is designed to be used in deeper wells having longer pipe string and a larger total volume and therefore weight of liquid therein, whereas as 1500 psi opening disc has application for somewhat shallower wells.

Figure 6:
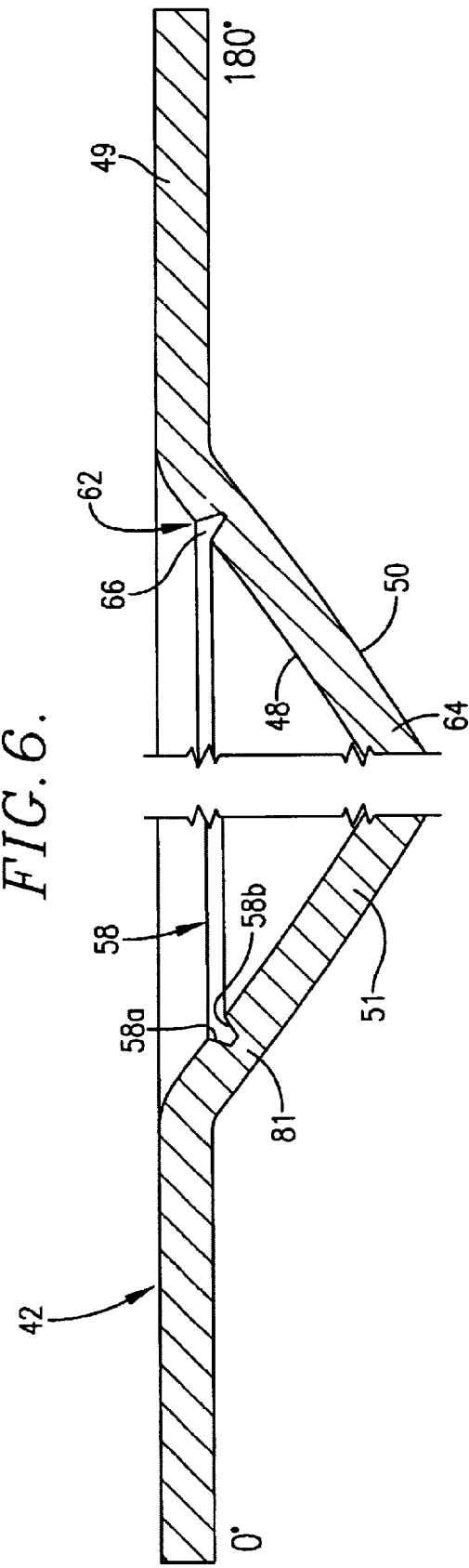
FIG. 6 is a view similar to that of FIG. 5, but illustrating the disc body after bulging thereof.

Referring to FIG. 6, it is to be observed that the obliquely oriented score line-defining sidewalls 58a and 58b of score line 58 diverge from a lower apex upwardly to the concave surface 66 of disc 42. When the disc 42 ruptures, movement of the burst region 46 effects relative separation between the walls 58a and 58b without any compressive forces exerted against these sidewall surfaces. This is to be contrasted with the more usual approach of providing a score line on the convex face. In such a situation, rupture of the disc causes the score line-defining sidewalls to move towards each other, thereby compressing these surface together.

The area of burst region 46 of disc 42 defined by score line segment 62 and at an imaginary continuation of the score line 58 in alignment herewith has been found to permit design of a disc of a diameter that will be received in closing relationship to a conventional pipe string, e.g., an overall diameter of 3¼ in. being typical, and that will reliably open at burst pressures of the order of 1500 to 2000 psi as compared with 4500 psi over pressure normally required to open a disc without the cam action afforded by cam score line segment 62 which is of greater depth than the hinge portion 81 of score line 58.

Although the invention has been described with reference to the preferred embodiment illustrated in the attached drawing figures and particularly when used in testing the integrity of an oil well pipe string, it is to be understood that the apparatus has utility for testing a variety of different liquid-conveying pipes or lines in petrochemical, petroleum refining, and other similar industrial applications. It is also to be noted that equivalents may be employed and substitutions made herein without departing from the scope of the invention as recited in the claims.

I claim:

1. Apparatus for testing the integrity of a sectional tubing string within an oil well casing, said apparatus comprising:
    a tubular holder presenting a passage therethrough and having opposed open ends, one of said holder ends being adapted for attachment to an end of one section of the tubing string;
    a rupture disc within said holder in normally closing relationship to said passage, said disc including an outer annular peripheral flange portion having a first annular face, an opposed second annular face and an inner circular margin, an inner concavo-convex, generally hemispherical bulged region inboard of and projecting away from said first annular face of the flange portion, said bulged region having opposed convex and concave faces and provided with an outer circular margin, and a unitary, annular, transversely arcuate transition region integral with and joining the outer circular margin of the bulged region with the inner circular margin of the flange portion,
    said bulged region being provided with a continuous score line in the concave face thereof adjacent the outer circular margin of the bulged region in proximal spaced relationship to said transition region, said score line defining a burst region and having a semi-circular segment of major length, and a generally curvilinear score line cam segment of minor length with respect to the length of said semi-circular score line segment, said cam score line segment projecting outwardly of the diameter of said major score line segment and located inboard of said transition region,
    said score line varying in depth along the length thereof with the score line being of greatest depth along said cam score line segment and of shallowest depth in substantially direct opposition to said cam score line segment to define a hinge portion of the score line,
    said disc being openable under the influence of liquid overpressure directed against the concave face of the disc to allow flow of the liquid past the disc, the cam score line segment being of a depth relative to the remaining portion of the score line to cause the cam score line segment to rupture first under said liquid pressure while the major score line segment is of a varying depth which allows the burst region to swing to a fully opened rupture position without severing of the hinge portion of the score line with the edge of the burst region disposed in generally perpendicular relationship to said flange portion of the disc,
    said tubular holder being provided with sidewall structure configured to generally complementally receive and, allow sufficient full opening of the rupture disc under said liquid overpressure to thereby permit full, substantially unimpeded bi-directional flow of liquid through the tubular holder after rupture of the disc.

2. Apparatus as set forth in claim 1 wherein said cam segment of the score line is of generally U-shaped configuration.

3. Apparatus as set forth in claim 2 wherein said cam segment of score line has an arcuate base portion and two opposed, outwardly diverging leg portions that merge with opposite extremities of the major score line segment.

4. Apparatus as set forth in claim 1 wherein said score line continuously varies in depth from in opposite directions from said hinge portion of the major score line segment to the midpoint of the cam score line segment.

5. Apparatus as set forth in claim 1 wherein said cam segment of the score line is from about 30% to about 70% of the thickness of the disc.

6. Apparatus as set forth in claim 1 wherein said disc has a thickness of from about 0.010 in. to about 0.075 in.

7. Apparatus as set forth in claim 6 wherein said disc has a thickness of from about 0.014 in. to 0.050 in.

8. Apparatus as set forth in claim 6 wherein said disc has a thickness of about 0.030 in.

9. Apparatus as set forth in claim 1 wherein the depth of the cam score line segment at the point of greatest depth is from about 0.015 in. to about 0.004 in. deeper than the shallowest depth of the hinge portion of the major score line segment.

10. Apparatus as set forth in claim 9 wherein the depth of the cam score line segment at the point of greatest depth is about 0.002 in. deeper than the shallowest depth of the hinge portion of the major score line segment.

11. A unitary, forward buckling, rupture disc adapted to be mounted on a tubular rupture disc holder in closing relationship to a central fluid passage through the holder and in which the holder passage is of dimensions accommodating full opening of the disc, said disc comprising:

a rupture disc adapted to be mounted in said holder in normally closing relationship to said passage, said disc including an outer annular peripheral flange portion having a first annular face, an opposed second annular face and an inner circular margin, an inner concavo-convex, generally hemispherical bulged region inboard of and projecting away from said first annular face of the flange portion, said bulged region having opposed convex and concave faces and provided with an outer circular margin, and a unitary, annular, transversely arcuate transition region integral with and joining the outer circular margin of the bulged region with the inner circular margin of the flange portion, said bulged region being provided with a continuous score line in the concave face thereof adjacent the outer circular margin of the bulged region in proximal spaced relationship to said transition region, said score line defining a burst region and having a semi-circular segment of major length, and a generally curvilinear score line cam segment of minor length with respect to the length of said semi-circular score line segment, said cam score line segment projecting outwardly of the diameter of said major score line segment and located inboard of said transition region, said score line varying in depth along the length thereof with the score line being of greatest depth along said cam score line segment and of shallowest depth in substantially direct opposition to said cam score line segment to define a hinge portion of the score line, said disc being openable under the influence of liquid overpressure directed against the concave face of the disc to allow flow of the liquid past the disc, the cam score line segment being of a depth relative to the remaining portion of the score line to cause the cam score line segment to rupture first under said liquid pressure while the major score line segment is of a varying depth which allows the burst region to swing to a fully opened rupture position for substantially full bidirectional flow of liquid without severing of the hinge portion of the score line with the edge of the burst region disposed in generally perpendicular relationship to said flange portion of the disc.

12. A disc as set forth in claim 11 wherein said cam segment of the score line is of generally U-shaped configuration.

13. A disc as set forth in claim 12 wherein said cam segment of score line has an arcuate base portion and two opposed, outwardly diverging leg portions that merge with opposite extremities of the major score line segment.

14. A disc as set forth in claim 11 wherein said score line continuously varies in depth in opposite directions from said hinge portion of the major score line segment to the midpoint of the cam score line segment.

15. A disc as set forth in claim 11 wherein said cam segment of the score line is from about 30% to about 70% of the thickness of the disc.

16. A disc as set forth in claim 11 wherein said disc has a thickness of from about 0.010 in. to about 0.075 in.

17. A disc as set forth in claim 16 wherein said disc has a thickness of from about 0.014 in. to 0.050 in.

18. A disc as set forth in claim 16 wherein said disc has a thickness of about 0.030 in.

19. A disc as set forth in claim 11 wherein the depth of the cam score line segment at the point of greatest depth is from about 0.001 in. to about 0.005 in. deeper than the shallowest depth of the hinge portion of the major score line segment.

20. A disc as set forth in claim 19 wherein the depth of the cam score line segment at the point of greatest depth is about 0.004 in. deeper than the shallowest depth of the hinge portion of the major score line segment.

21. A disc as set forth in claim 11 wherein said disc has a nominal thickness of about 0.03 in., and the depth of the score line varies from about 0.013 in. at the shallowest point of the major score line segment to about 0.017 in. at the deepest point of the cam segment of the score line.

22. A disc as set forth in claim 11 wherein said disc has a nominal thickness of about 0.03 in., and the depth of the score line varies from about 0.013 in. at the shallowest point of the major score line segment to about 0.015 in. to about 0.017 in. at the deepest point of the cam segment of the score line.

23. A disc as set forth in claim 11 wherein said disc is constructed of a material and the dimensions of the disc and the varying depth of the score line relative to thickness of the disc is such that the cam score line segment opens first under a liquid pressure against the bulged region of the disc of about 1500 psi.

24. A disc as set forth in claim 11 wherein said disc is constructed of a material and the dimensions of the disc and the varying depth of the score line relative to thickness of the disc is such that the cam score line segment opens first under a liquid pressure against the bulged region of the disc of about 2000 psi.

* * * * *

UNITED STATES PATENT AND TRADEMARK OFFICE
CERTIFICATE OF CORRECTION

PATENT NO. : 6,672,389 B1  
DATED : January 6, 2004  
INVENTOR(S) : Hinrichs, James O.

Page 1 of 1

It is certified that error appears in the above-identified patent and that said Letters Patent is hereby corrected as shown below:

<u>Title page,</u>  
Item [54], Title, should read: -- BULGED SINGLE-HINGED SCORED RUPTURE DISC HAVING A NON-CIRCULAR VARYING DEPTH SCORE LINE --

Signed and Sealed this

Seventeenth Day of August, 2004

JON W. DUDAS  
*Acting Director of the United States Patent and Trademark Office*